April 6, 1948.　　　E. M. ROACH　　　2,439,022
COLLAPSIBLE DISPLAY FRAME
Filed Feb. 26, 1944　　　6 Sheets-Sheet 1
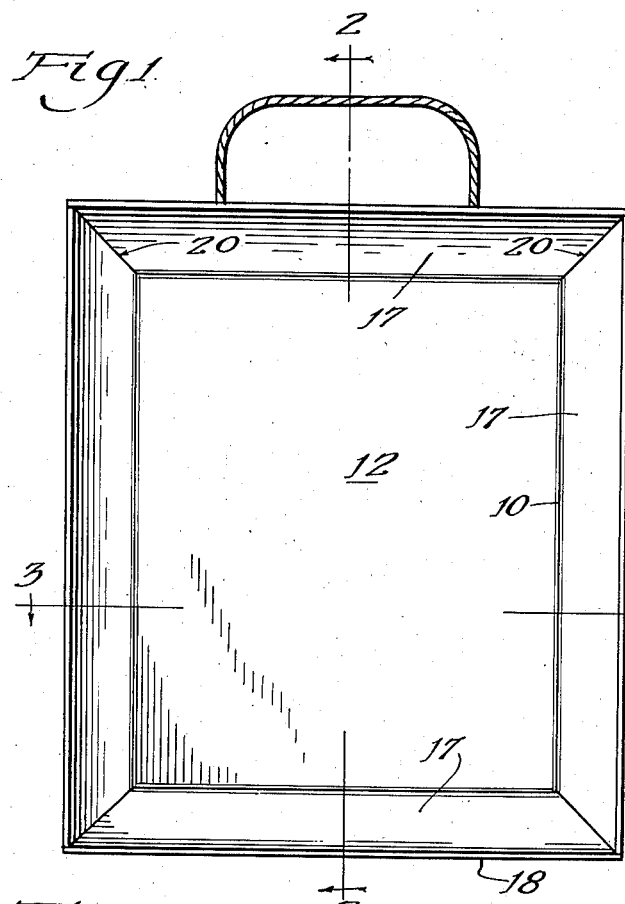
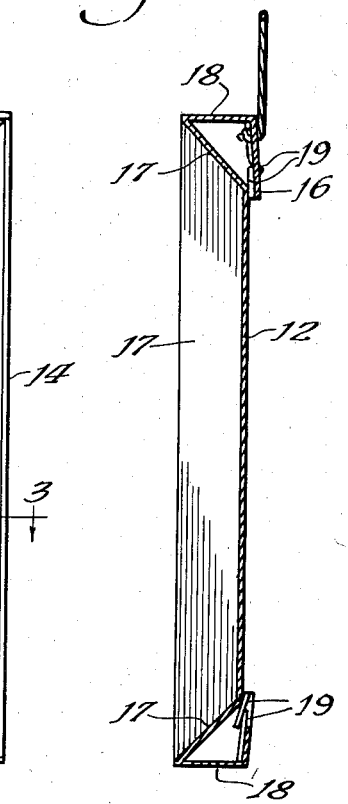
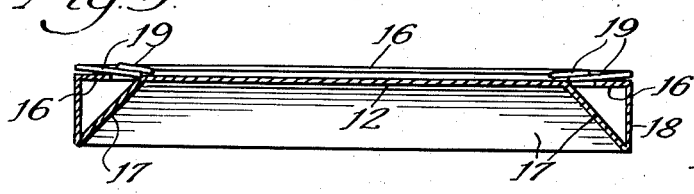
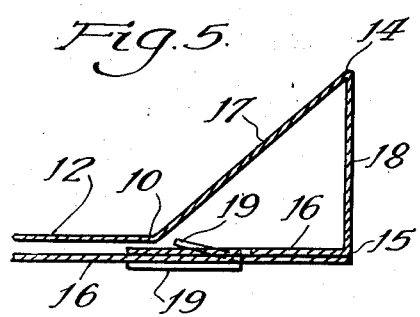
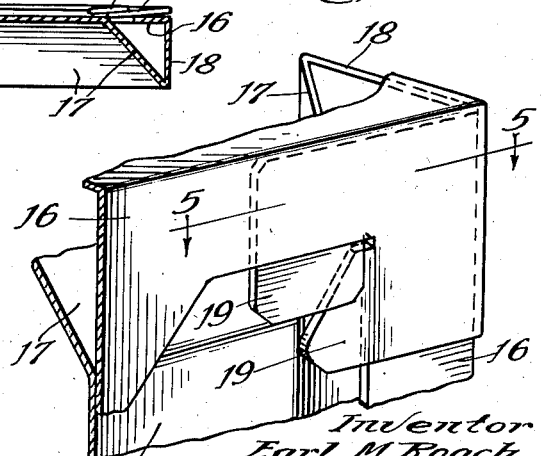
Inventor
Earl M. Roach
By Lee J. Gary
Attorney April 6, 1948.  E. M. ROACH  2,439,022
COLLAPSIBLE DISPLAY FRAME
Filed Feb. 26, 1944  6 Sheets-Sheet 2
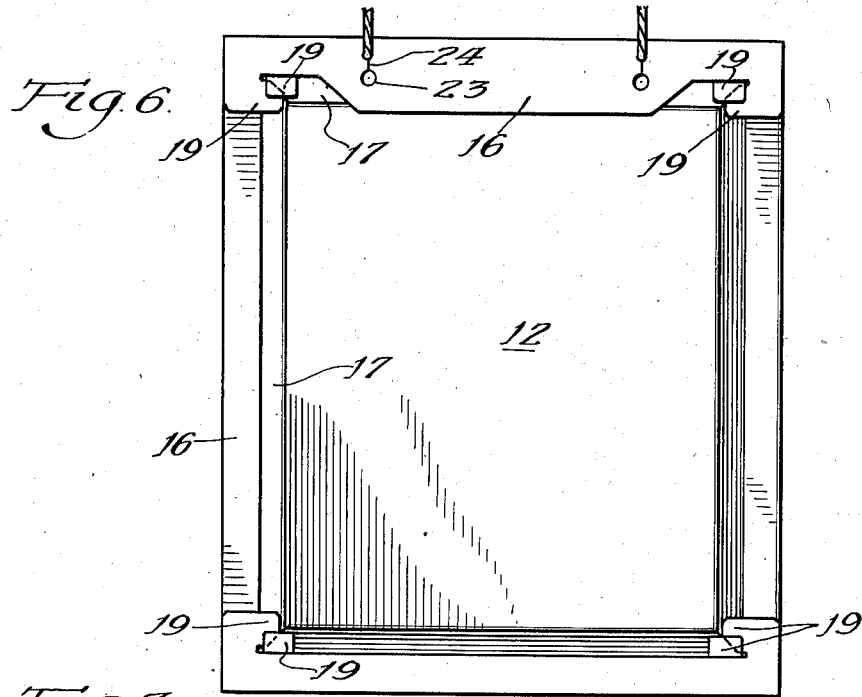
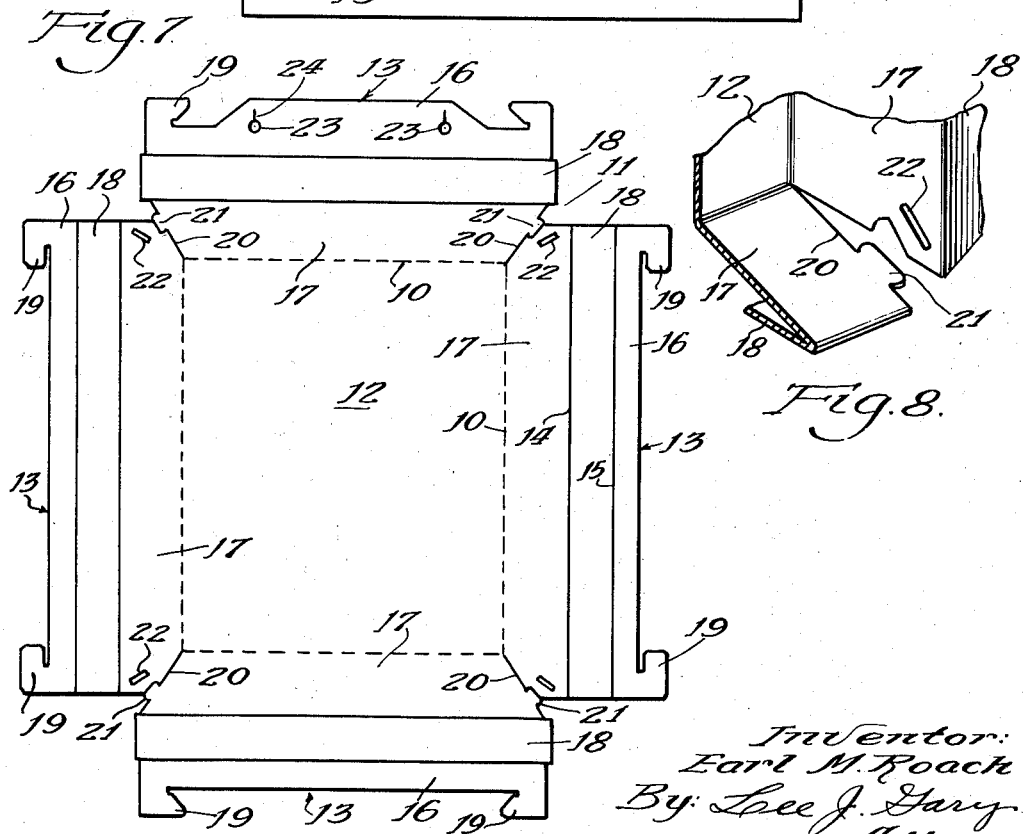
Inventor:
Earl M. Roach
By Lee J. Gary
Attorney April 6, 1948. E. M. ROACH 2,439,022
COLLAPSIBLE DISPLAY FRAME
Filed Feb. 26, 1944 6 Sheets-Sheet 3
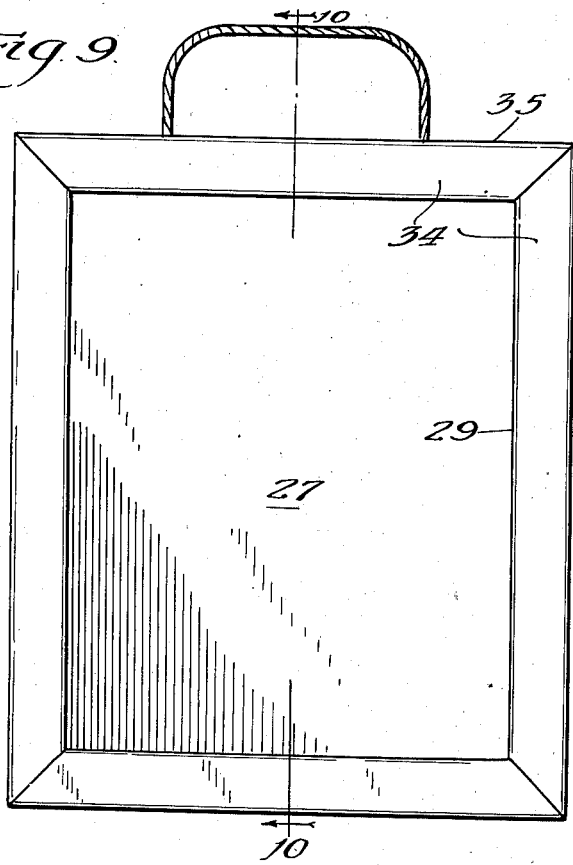
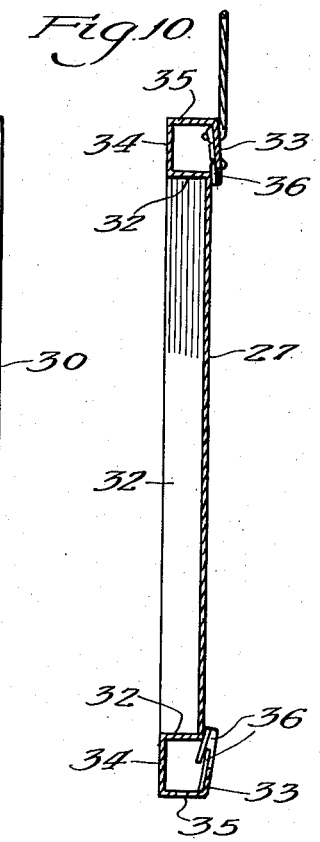
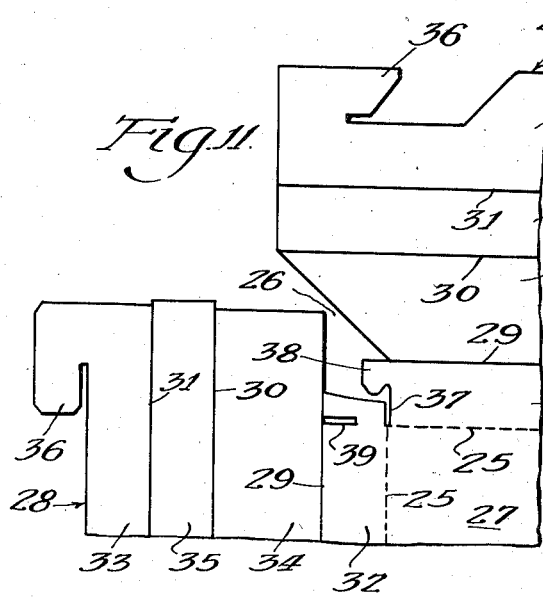
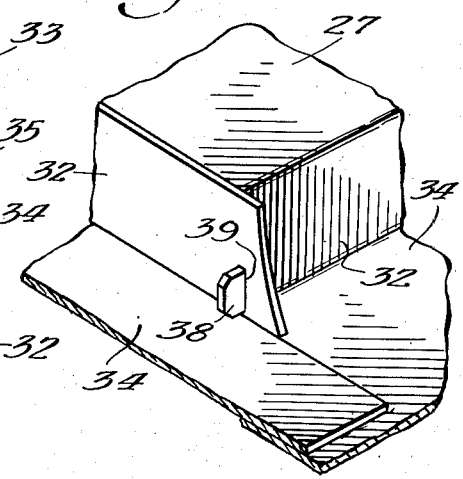
Inventor:
Earl M. Roach
By: Lee J. Gary
Attorney

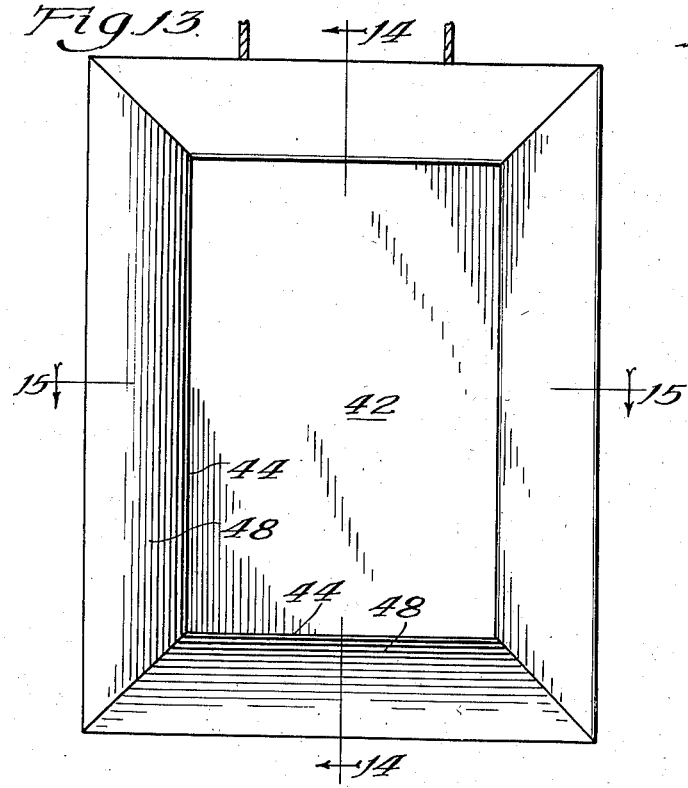
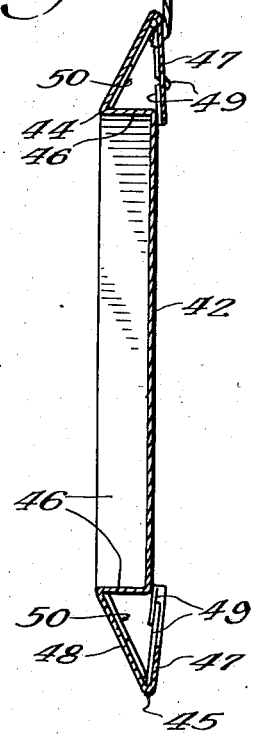
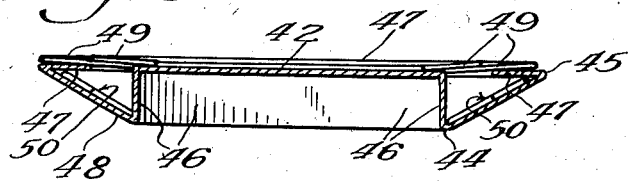
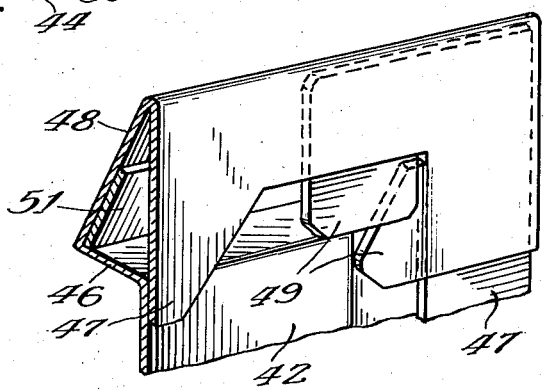
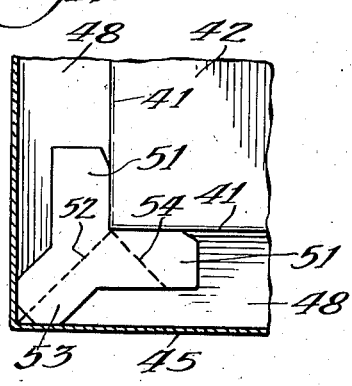

April 6, 1948. E. M. ROACH 2,439,022
COLLAPSIBLE DISPLAY FRAME
Filed Feb. 26, 1944 6 Sheets-Sheet 5
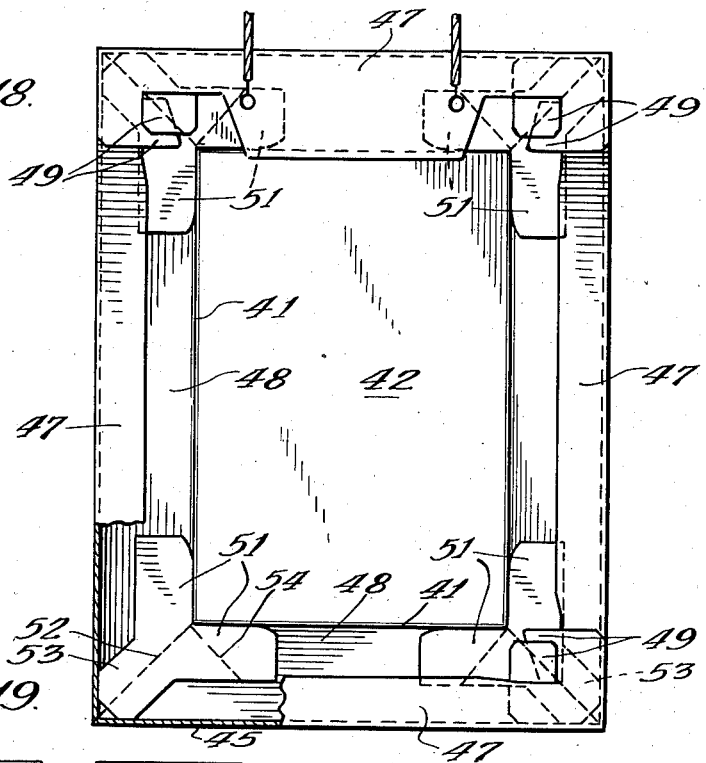
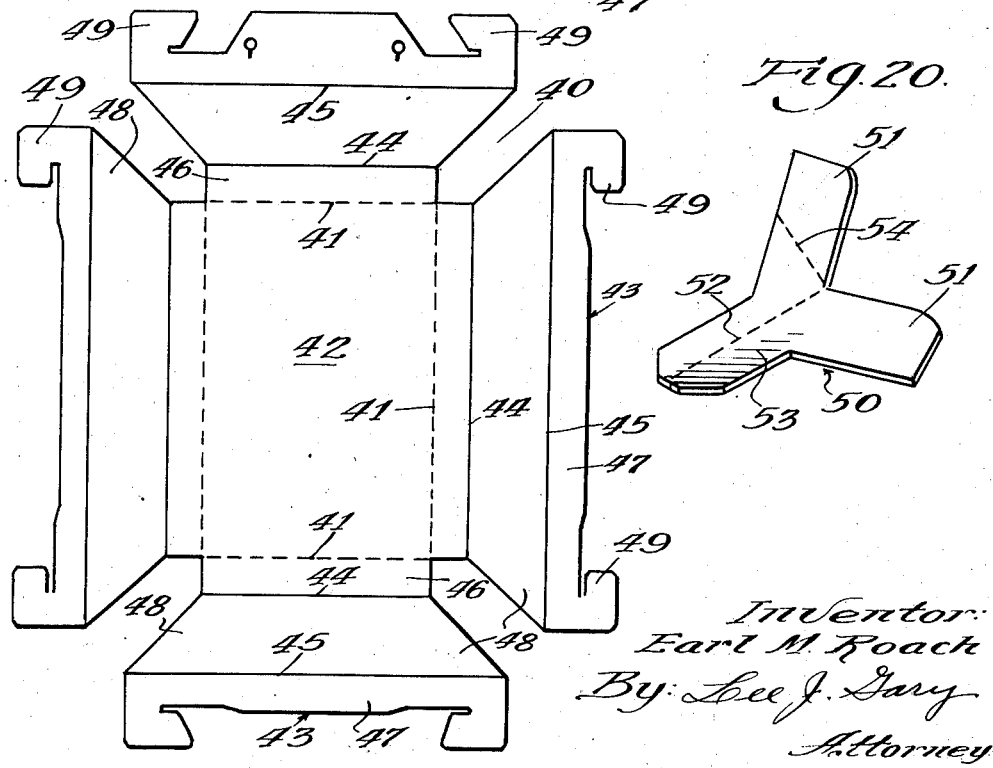
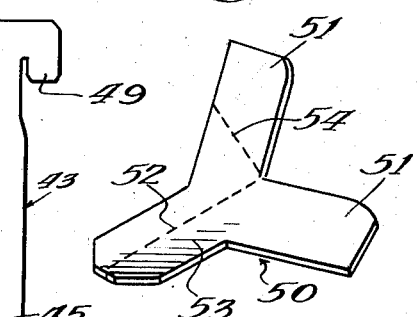
Inventor:
Earl M. Roach
By Lee J. Gary
Attorney

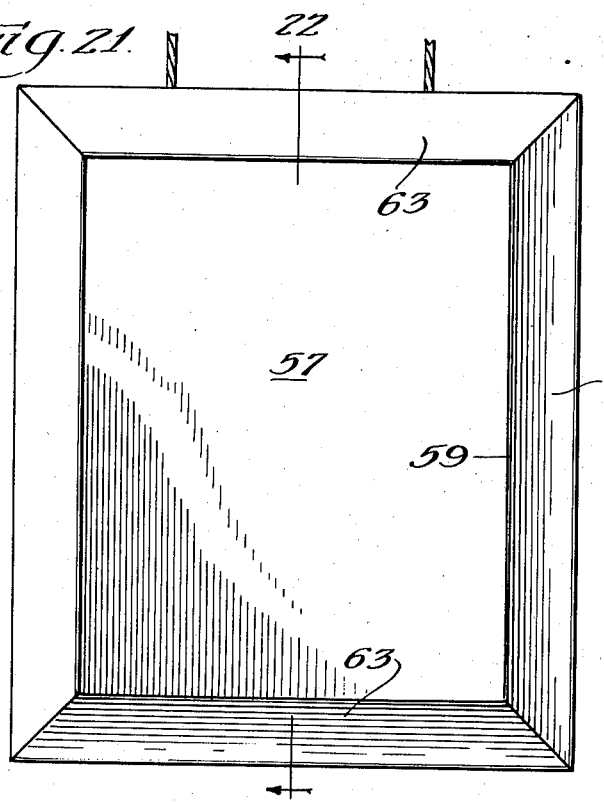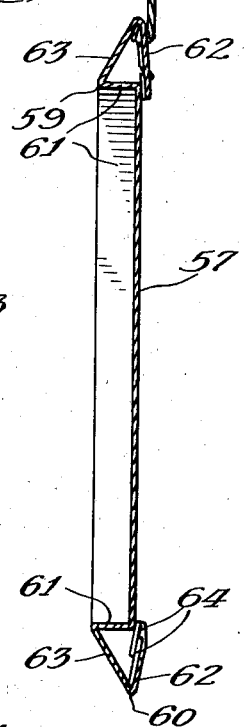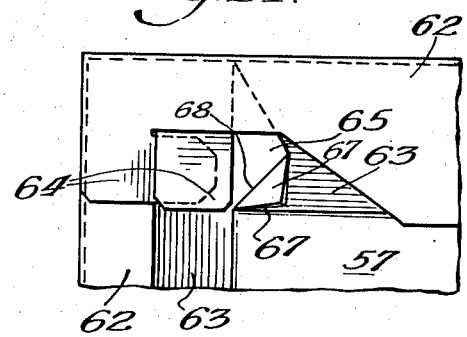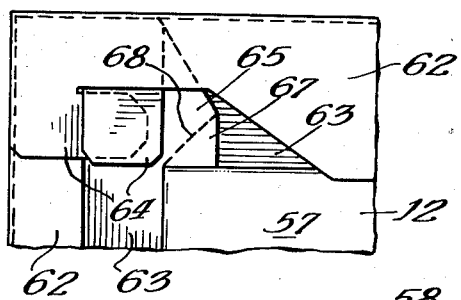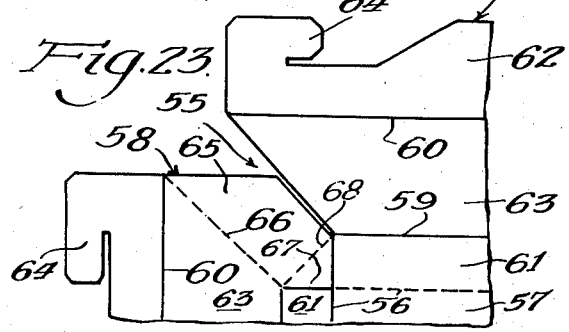

Patented Apr. 6, 1948

2,439,022

UNITED STATES PATENT OFFICE 2,439,022

COLLAPSIBLE DISPLAY FRAME

Earl M. Roach, Chicago, Ill., assignor to Arvey Corporation, Chicago, Ill., a corporation of Illinois Application February 26, 1944, Serial No. 524,128

10 Claims. (Cl. 40—154)

This invention relates to improvements in a collapsible framed display constructed of foldable material and particularly to a display construction which can be packed and shipped for transportation by the manufacturer in fully opened or collapsed form, and thereafter readily and conveniently assembled or set up and locked in set-up position by the user.

My invention particularly relates to collapsible displays of the type embodying a central panel and integral side pieces forming a hollow frame for the central panel, the frame projecting forwardly of the face of the panel. In collapsible displays of this class it is generally necessary for the manufacturer to at least partially set up the display, or certain of the side panels which form of the frame or rim, by gluing, stapling or other such expedients.

It is an object of the present invention to provide a truly and fully collapsible display which does not require any pre-assembly by the manufacturer but which may be shipped in fully opened up condition and which thereafter may be rapidly and conveniently assembled and set up by the user without the necessity for previous or subsequent gluing or stapling or the employment of similar assembly aids.

In general, my invention comprises a collapsible display constructed of foldable material, pre-cut and scored to provide a central panel of polygonal shape such as a rectangle or triangle, the central panel having side pieces secured to the edges thereof and foldable from the plane of the central panel, to form a hollow angular forwardly projecting frame for said central panel. Each of the side pieces are provided with spaced score lines or lines of fold dividing each piece into a plurality of elongated side panels disposed lengthwise with respect to the central panel.

These side pieces comprise an outermost side panel adapted to be rearwardly folded so as to extend parallel to the central panel, an innermost side panel contiguous with the central panel and adapted to be folded forwardly of the face of and to extend angularly to the central panel, and one or two intermediate panels. If the frame is to be of a hollow triangular form, one intermediate side panel is employed, and if the frame is to be rectangular, two intermediate panels are employed.

The invention is characterized by the employment of complementary interlocking tab means extending from the end portions of the outermost side panels for maintaining them in rearwardly folded position and in interlocked relationship with each other, together with supplemental means, provided on or acting against the innermost side panels for fixedly maintaining the latter in forwardly extending symmetrical angular relationship to the central panel and to each other, with the component side panels in angular predetermined relationship to each other to provide a hollow frame of angular cross-sections. By the employment of the two sets of locking or support means, necessity for adhesively uniting or stapling any of the side panel portions to each other or the central panel is eliminated, and yet at the same time the central panel is provided with a rigid forwardly projecting frame which is locked in extended or set-up position.

Other objects of my invention relate to the details of construction and arrangement of parts and other advantages which will be apparent from the following specification and drawings wherein:

Fig. 1 is a face view of a collapsible cardboard display illustrating an embodiment of my invention.

Fig. 2 is a sectional view taken on the line 2—2 of Fig. 1.

Fig. 3 is a sectional view taken on the line 3—3 of Fig. 1.

Fig. 4 is a relatively enlarged fragmentary detail view in perspective illustrating one corner of the collapsible display of Fig. 1 viewed from the rear thereof.

Fig. 5 is a fragmentary section taken on line 5—5 of Fig. 4.

Fig. 6 is a rear view of the collapsible display illustrated in Fig. 1.

Fig. 7 is a blank development of the display illustrated in the preceding figures.

Fig. 8 is a fragmentary detail view in perspective illustrating the tongue and slot interlocking means on the adjacent ends of the innermost side panels employed in the embodiment illustrated in the preceding figures.

Fig. 9 is a face view of a collapsible display illustrating another embodiment of my invention.

Fig. 10 is a section on the line 10—10 of Fig. 9.

Fig. 11 is a fragmentary blank development of the display illustrated in Fig. 9.

Fig. 12 is a fragmentary, relatively enlarged detail view in perspective of the display of Fig. 9 viewed rearwardly thereof, and particularly illustrating the locking engagement means of the innermost side panels.

Fig. 13 is a face view of a collapsible display illustrating another embodiment of my invention.

Fig. 14 is a section taken on line 14—14 of Fig. 13.

Fig. 15 is a section taken on the line 15—15 of Fig. 13.

Fig. 16 is a relatively enlarged fragmentary detail view of the display of Fig. 13 viewed rearwardly thereof and in perspective illustrating the interlocking engagement means of the outermost side panels thereof.

Fig. 17 is a fragmentary detail view of the display of Fig. 13 viewed rearwardly thereof and in section through the line of fold of the outermost side panel.

Fig. 18 is a rear view of the display illustrated in Fig. 13 with parts broken away.

Fig. 19 is a blank development of the display illustrated in Fig. 13.

Fig. 20 is a perspective detail view illustrating the separate locking wedge for acting against the innermost side flaps, in the form of Figs. 13 to 19.

Fig. 21 is a face view of a collapsible display illustrating another embodiment of my invention.

Fig. 22 is a section on the line 22—22 of Fig. 21.

Fig. 23 is a fragmentary blank development of the display illustrated in Fig. 21.

Fig. 24 is a fragmentary rear view of the display illustrated in Fig. 21, in partly locked position.

Fig. 25 is a view similar to that of Fig. 24 in fully locked position.

Referring to the drawings, the form of collapsible display illustrated by Figs. 1 to 8 comprises a cardboard collapsible display formed of a unitary blank scored on the lines 10, and cut in the corners as at 11 to define a rectangular central panel 12 and contiguous side pieces generally indicated as 13. Each of the side pieces 13 is further scored to provide it with spaced lines of fold 14 and 15 dividing it into an outermost side panel 16, innermost side panel 17 contiguous with the central panel 12, and an intermediate side panel 18. Each of the outermost side panels 16 is provided with a pair of hook-like tabs 19 adjacent the ends of the panel, the tabs 19 and the adjacent ends of two panels being adapted to overlap and the tabs interlockingly engage with each other when the panels 16 are folded in a rearward return bent direction, whereby these outermost side panels are held interlocked in a plane substantially parallel to the plane of the central panel 12. One pair of opposed innermost side panels 17 is formed with end portions 20 cut at an angle and provided with endwise projecting tongues or lugs 21. The other pair of opposed innermost panels 17 is provided with slots 22 inwardly of the ends of this relatively longer pair of panels, the slots 22 being formed on an angular line equal to the angularity of the ends 20 of the other pair of opposed panels. Thus when the panels 17 are folded forwardly with respect to the face of the central panel 12 on the score lines 10, the tabs or tongues 21 may be projected in a firm frictional fit through the slots 22, and the pair of panels provided with the ends 20 brought into abutment against the adjacent projected ends of the second pair of opposed panels 17.

Thus in setting up the form of a collapsible display illustrated in Figs. 1 to 8, the four panels 17 are bent forwardly on their score lines 10 with respect to the face of the panel 12, which is generally provided with an advertising display, the tabs 21 projected through the slots 22, and the adjacent edges of the panels 17 brought into abutting and interlocking engagement, forwardly inclined to the face of the panels 12. The side pieces are thereafter further folded on the score lines 14 and 15 in a rearward direction so as to bring the outermost side panels 16 in a position substantially parallel to the plane of the central panel 12 and the hook tabs 19 of adjacent panels overlapped in interlocked engagement with each other, the intermediate side panel 18 being thereby brought into angular extension between the panels 16 and 17, or as illustrated these intermediate side panels 18 are caused to extend in a direction perpendicular to the plane of the central panel 12.

This causes the central panel 12 and the display thereon to be framed by means of a hollow, angular or triangular frame which projects forwardly from the face of the panel 12 in a neat, firm, framing relationship resistant against displacement and firmly fixed and locked without the aid of or necessity for use of gluing, stapling, and the like.

If desired the set-up display may be suspended by a suitable cord extending through apertures 23 and slits 24 provided in one of the outermost side panels 16.

The form of construction illustrated by Figs. 9 to 12, is generally similar in arrangement and construction as the form illustrated by Figs. 1 to 8, with the exception that the form of Figs. 9 to 12 illustrates a hollow frame of rectangular section. This form of construction comprises a blank scored on the lines 25 and notched or cut at the corners 26 to define a central rectangular panel at 27 and four contiguous side pieces each generally indicated as 28.

Each of the side pieces 28 is provided with spaced lines of fold 29, 30 and 31 to divide them into an innermost side panel 32 contiguous with the central panel 27, outermost side panel 33, and a pair of intermediate side panels 34 and 35. Each of the outermost side panels 33 is provided within a pair of hooked end tabs 36. One opposed pair of innermost side panels 32 is provided with rectangular ends 37 provided with endwise projecting tongues or tabs 38, these tongues being adapted to be inserted in firm frictional engagement through the slots 39 provided inwardly of the ends of the opposed relatively longer pair of innermost side panels 32 so that the innermost side panels 32 will be permitted to come into perpendicular relationship to the central panel 27, with the end of one panel 32 abutting against the face of the adjacent end of another panel 32.

In further setting up the display the panels 33, 34 and 35 are folded rearwardly on the score lines 31, 30 and 29 respectively so as to bring the outermost side panels 33 into a relationship parallel to the plane of the central panel 27 and thereafter the adjacent ends bearing the hooked tabs 36 are interlocked causing the intermediate side panels 34 and 35 to extend angularly between the panels 32 and 33 with the panel 34 parallel to the plane of the central panel 27 and parallel to the outermost panel 33, and with the panel 35 extending parallel to the panel 32 or perpendicular to the plane of the central panel 27.

Figs. 13 to 20 illustrate another modified form of construction which in general is similar to the previously described and illustrated forms of collapsible cardboard displays, with the exception that means non-integral with the blank of which the display is composed, is employed for the purpose of locking the innermost side panels in erect or set up position. This form of collapsible display comprises a blank notched in the corners as at 40 and provided with the score lines 41 to define a central panel 42 and four side pieces each generally indicated as 43. These side pieces are provided with spaced lines of fold 44 and 45, dividing each of the side pieces into an innermost side panel 46 contiguous with the central panel 42, an outermost side panel 47, and intermediate side panel 48.

As in the preceding forms, each of the outermost side panels 47 is formed adjacent their ends with a pair of hook lugs 49, these outermost side panels being adapted to be rearwardly folded on the score line 45. When they are thus rearwardly folded an adjacent pair of lugs 49 may be overlapped and interlocked, with the panels 47 lying in a plane substantially parallel to the plane of the central panel 42. The panels 48 are also rearwardly folded on the score lines 44, whereas the panels 46 are adapted to be forwardly folded on the score lines 41. The ends of each of the panels 46 are rectangular, and each of the panels 46 are the same length as the side of the central panel to which they are attached, so that when they are inclined forwardly on their score lines 41 they may be raised to position perpendicular to the plane of the panel 42, and in this position the intermediate trapezoidal panels 48 will incline between the panels 47 and 46, the ends of the panels 48 being cut at an angle so that they may be brought into miter joint meeting engagement.

However, in order to cause the component panels of each of the side pieces 43 to be locked in a position wherein the adjacent edges of the panels 46 and of panels 48 will be in meeting engagement so as to form a forwardly projecting hollow and angular rim, I provide the Y-shaped locking inserts generally indicated by the reference numeral 50 and shown in detail in Fig. 20. The two arms 51 thereof define a right angle between them, the piece being further provided with a score line 52 along the leg 53, the score line extending from the end of the leg 53 to the corner of the angle between the arms 51. The length of leg 53 is such that when the locking member 50 is inserted within the hollow of the folded side pieces 43, it may be snugly lodged parallel to and overlapping the adjacent ends of two panels 48 with the legs 51 embracing the adjacent ends of a pair of innermost side panels 46, and the beveled corners of leg 53 against the score lines 45 beneath the over folded outermost side panels 47. If desired the locking member 50 may be inserted before the panels 47 are over-folded and the lugs 49 interlocked, but more conveniently the panels 46, 47 and 48 are first folded in their proper directions as defined by their score lines, the lugs 49 of the adjacent panels 47 interlocked and thereafter a member 50 inserted with a leg 53 thereof beneath the over folded interlocking ends of two adjacent panels 47, and the two arms 51 pressed into wedged embracing engagement with the adjacent end portions of two panels 46 so as to cause the panels 46 to be elevated and their ends brought into meeting engagement. For convenience in inserting and bringing the members 50 into locking engagement they may be further provided with a score line 54 extending obliquely of one of the legs 51, and before inserting the unit one leg 51 bent up along its score line and after the unit 50 has been inserted, the bent up leg 51 may be pressed down into secured wedged position.

Thus, the locking unit 50 performs substantially the same function as the tongue and slot arrangement on the innermost side panels on the two previously illustrated and described forms of construction, the locking means, in this case the separate unit 50, acting against the innermost side panels and together with the interlocking hooks or lugs on the outermost side panels causes the component side panels of each of the side pieces to be maintained in a firm fixed predetermined position and in expanded or fixed angular relationship to each other, the side pieces as a whole projecting forwardly of the face of the central display panel.

The form of construction illustrated in Figs. 21 to 25 is to some extent related to the form of construction of Figs. 13 to 20, but with the exception that the means for holding the innermost side panels in set up position is formed integral with an opposed pair of intermediate side panels. This form of construction comprises a blank notched or cut at the corners as at 55 and scored as at 56 to define a central panel generally indicated as 57 and four side pieces each generally indicated as 58.

Each of the side pieces is provided with spaced score lines or lines of fold 59 and 60 dividing the side pieces into an innermost side panel 61 contiguous with the central panel 57, an outermost side panel 62, and an intermediate side panel 63. As in the previous forms, each of the outermost side panels 62 is provided with hook-like lugs 64, the outermost side panels 62 being adapted to be rearwardly and return folded on the score lines 60, and the lugs 64 on the adjacent ends of two panels overlapped and brought into interlocking engagement, the panels 62 being brought into a plane substantially parallel to the plane of the central panel 57. Each of the panels 61 is equal to the length of the side to which they are attached, their ends being rectangular and the score lines 56 being adapted to permit the panels 61 to be forwardly elevated so that the panels 61 may be brought into perpendicular extension with the face of the panel 57 with the ends of panels 61 in abutting relationship. The panels 63 are trapezoidal, and when the panels 61 are elevated and the panels 62 rearwardly folded, the panels 63 extend angularly between the panels 61 and 62, and the adjacent ends of the panels 63 may be brought into miter joint meeting engagement.

For the purpose of holding the panels 61 in locked and fixed elevated position and to maintain the side pieces comprising the frame in the form of a hollow rim of angular cross section, I provide locking extensions 65 integral with the ends of one opposed pair of intermediate panels 63, the locking lugs being defined from their component panels by a score line 66, this score line extending obliquely so as to define the ends of each of the panels 63 at an equal angle.

The lug 65 in the blank form illustrated in Fig. 23 is formed with a laterally extending end portion 67 adapted to embrace at a right angle the end portion of an adjacent panel 61 when elevated. The outer defining edge of the lug 65 likewise defines a right angle with the score line 60 at the outer edge of panel 63. Thus in setting up the display illustrated in Figs. 21 to 24, the panels 61 are elevated forwardly of the face of central panel 57 and the panels 62 and 63 bent rearwardly on their respective score lines 60 and 59, the locking lug 65 with its end portion 67 folded upwardly on the oblique score line 68, as shown in Fig. 24, is initially caused to extend rearwardly of the end of an adjacent panel 63, and the outermost side panels 62 extended parallel to central panel 57 and their lugs 55 overlapped and interlocked.

When the panels 61 are elevated to extend perpendicularly to panel 57, the end 67 of locking lug 65 is firmly pressed down into frictional embracing engagement with and around the end of the adjacent panel 61, and overlapped against the inner face of the end portion of the adjacent intermediate panel 63 between score lines 59 and 60, the area taken up by the score lines having somewhat narrowed panel 63, to thereby hold the panels 61 firmly locked in set up position, and with the aid of interlocked panels 62 the side pieces are maintained in the form of hollow angular frames in firm predetermined and set-up position, with the frame projecting forwardly of the face of the central panel.

I claim as my invention:

1. In a collapsible display constructed of foldable material comprising a polygonal-shaped central panel, side pieces severed from each other and secured to the side edges of said central panel and foldable from the plane thereof to form a hollow angular forwardly projecting frame for said central panel, each of said side pieces being provided with spaced lines of fold dividing each side piece into a plurality of elongated side panels disposed lengthwise with respect to the side edges of said central panel comprising an outermost side panel adapted to be rearwardly folded and to extend parallel to said central panel, at least one intermediate side panel, and an innermost side panel adapted to be folded forwardly of the face of and to extend angularly to said central panel, complementary inter-lockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental means for fixedly maintaining said innermost side panels in forwardly extending symmetrical angular relationship to said central panel and the component side panels in angular relationship to each other.

2. In a collapsible display constructed of foldable material comprising a polygonal-shaped central panel, side pieces severed from each other and secured to the side edges of said central panel and foldable from the plane thereof to form a hollow angular forwardly projecting frame for said central panel, each of said side pieces being provided with spaced lines of fold dividing each side piece into a plurality of elongated side panels disposed lengthwise with respect to the side edges of said central panel comprising an outermost side panel adapted to be rearwardly folded and to extend parallel to said central panel, at least one intermediate side panel, and an innermost side panel adapted to be folded forwardly of the face of and to extend angularly to said central panel, complementary inter-lockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and interlocking slot and tab means on said innermost side panels for fixedly maintaining them in forwardly extending symmetrical angular relationship to said central panel and the component side panels in angular relationship to each other.

3. In a collapsible display constructed of foldable material comprising a rectangular central panel, side pieces severed from each other and secured to the side edges of said central panel and foldable from the plane thereof to form a hollow angular forwardly projecting frame for said central panel, each of said side pieces being provided with spaced lines of fold dividing each side piece into a plurality of elongated side panels disposed lengthwise with respect to the side edges of said central panel comprising an outermost side panel adapted to be rearwardly folded and to extend parallel to said central panel, at least one intermediate side panel, and an innermost side panel adapted to be folded forwardly of the face of and to extend angularly to said central panel, complementary inter-lockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental means for fixedly maintaining said innermost side panels in forwardly extending symmetrical angular relationship to said central panel and the component side panels in angular relationship to each other, said supplemental means comprising tabs projecting endwise from one opposed pair of innermost side panels frictionally engageable through slots provided adjacent the ends of the other opposed pair of innermost side panels.

4. In a collapsible display constructed of foldable material comprising a rectangular central panel, side pieces severed from each other and secured to the side edges of said central panel and foldable from the plane thereof to form a hollow triangular forwardly projecting frame for said central panel, each of said side pieces being provided with spaced lines of fold dividing each side piece into a plurality of elongated side panels disposed lengthwise with respect to the side edges of said central panel consisting of an outermost side panel adapted to be rearwardly folded and to extend parallel to said central panel, an intermediate side panel, and an innermost side panel adapted to be folded forwardly of the face of and to extend angularly to said central panel, complementary inter-lockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental means for fixedly maintaining said innermost side panels in forwardly extending symmetrical angular relationship to said central panel and the component side panels in said angular relationship to each other, said supplemental means comprising tabs projecting endwise from one opposed pair of innermost side panels frictionally engageable through slots provided adjacent the ends of the other opposed pair of innermost side panels.

5. In a collapsible display constructed of foldable material comprising a rectangular central panel, side pieces severed from each other and secured to the side edges of said central panel and foldable from the plane thereof to form a hollow rectangular forwardly projecting frame for said central panel, each of said side pieces being provided with spaced lines of fold dividing each side piece into a plurality of elongated side panels disposed lengthwise with respect to the side edges of said central panel consisting of an outermost side panel adapted to be rearwardly folded and to extend parallel to said central panel, a pair of intermediate side panels, and an innermost side panel adapted to be folded forwardly of the face of and to extend angularly to said central panel, complementary inter-lockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental means for fixedly maintaining said innermost side panels in forwardly extending symmetrical angular relationship to said central panel and the component side panels in said angular relationship to each other, said supplemental means comprising tabs projecting endwise from one opposed pair of innermost side panels frictionally engageable through slots provided adjacent the ends of the other opposed pair of innermost side panels.

6. In a collapsible display constructed of foldable material comprising a polygonal-shaped central panel, side pieces severed from each other and secured to the side edges of said central panel and foldable from the plane thereof to form a hollow angular forwardly projecting frame for said central panel, each of said side pieces being provided with spaced lines of fold dividing each side piece into a plurality of elongated side panels disposed lengthwise with respect to the side edges of said central panel comprising an outermost side panel adapted to be rearwardly folded and to extend parallel to said central panel, an intermediate side panel, and an innermost side panel adapted to be folded forwardly of the face of and to extend angularly to said central panel, complementary inter-lockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental wedge support means adapted to act against said innermost side panels to hold them elevated in forwardly extending symmetrical angular relationship to said central panel with the component side panels in angular relationship to each other.

7. In a collapsible display constructed of foldable material comprising a polygonal-shaped central panel, side pieces severed from each other and secured to the side edges of said central panel and foldable from the plane thereof to form a hollow triangular forwardly projecting frame for said central panel, each of said side pieces being provided with spaced lines of fold dividing each side piece into a plurality of elongated side panels disposed lengthwise with respect to the side edges of said central panel consisting of an outermost side panel adapted to be rearwardly folded and to extend parallel to said central panel, an intermediate side panel, and an innermost side panel adapted to be folded forwardly of the face of and to extend angularly to said central panel, complementary interlockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental wedge lock means extending between the fold lines of said intermediate panels at the corners of said frame for acting against and fixedly maintaining said innermost side panels in forwardly extending symmetrical angular relation relationship to said central panel and the component side panels in triangular relationship to each other.

8. In a collapsible display constructed of foldable material comprising a polygonal-shaped central panel, side pieces severed from each other and secured to the side edges of said central panel and foldable from the plane thereof to form a hollow triangular forwardly projecting frame for said central panel, each of said side pieces being provided with spaced lines of fold dividing each side piece into a plurality of elongated side panels disposed lengthwise with respect to the side edges of said central panel consisting of an outermost side panel adapted to be rearwardly folded and to extend parallel to said central panel, an intermediate side panel, and an innermost side panel adapted to be folded forwardly of the face of and to extend angularly to said central panel, complementary interlockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other, and supplemental wedge lock means extending laterally from the end portions of one opposed pair of intermediate side panels for overlying the adjacent ends of the opposed pair of intermediate side panels and into embracing supporting engagement with the end portions of an opposed pair of innermost side panels to thereby fixedly maintain said innermost side panels in elevated forwardly extending symmetrical angular relationship to said central panel and the component side panels in triangular relationship to each other.

9. In a collapsible display constructed of foldable material comprising a polygonal-shaped central panel, separated side pieces secured to the side edges of said central panel and foldable from the plane thereof to form a hollow angular frame for said central panel, each of said side pieces being provided with spaced lines of fold dividing each side piece into a plurality of elongated side panels disposed lengthwise with respect to the side edges of said central panel and comprising an outermost side panel adapted to be rearwardly folded and to extend parallel to the said central panel, complementary interlockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other.

10. In a collapsible display constructed of foldable material comprising a rectangular central panel, side pieces secured to the separated side edges of said central panel and foldable from the plane thereof to form a hollow angular frame for said central panel, each of said side pieces being provided with spaced lines of fold dividing each side piece into a plurality of elongated side panels disposed lengthwise with respect to the side edges of said central panel and comprising an outermost side panel adapted to be rearwardly folded and to extend parallel to the said central panel, complementary interlockable hook-tab means adjacent the ends of said outermost side panels, said hook-tabs at the opposite ends of each outer panel extending parallel therewith and towards each other, so that when said display is assembled, the complementary hook-tabs will be in superimposed engagement and frictionally maintain said outermost side panels in rearwardly folded and interlocked relationship with each other for maintaining said panels in rearwardly folded and fixed relationship with each other.

EARL M. ROACH.

REFERENCES CITED

The following references are of record in the file of this patent:

UNITED STATES PATENTS

| Number | Name | Date |
| --- | --- | --- |
| 1,157,915 | Watts | Oct. 26, 1915 |
| 1,513,050 | Kristopek | Oct. 28, 1924 |
| 1,839,825 | Ashe | Jan. 5, 1932 |
| 2,055,201 | Leigh | Sept. 22, 1936 |
| 2,093,972 | Ziemmerman | Sept. 21, 1937 |
| 2,146,318 | Viscount | Feb. 7, 1939 |
| 2,181,827 | Ziemmerman | Nov. 28, 1939 |